US010140315B1

United States Patent
Hohwald et al.

(10) Patent No.: US 10,140,315 B1
(45) Date of Patent: Nov. 27, 2018

(54) IDENTIFYING VISUAL PORTIONS OF VISUAL MEDIA FILES RESPONSIVE TO VISUAL PORTIONS OF MEDIA FILES SUBMITTED AS SEARCH QUERIES

(71) Applicant: SHUTTERSTOCK, INC., New York, NY (US)

(72) Inventors: Heath Hohwald, Logrono (ES); Kevin Scott Lester, Summit, NJ (US)

(73) Assignee: Shutterstock, Inc., New York, NY (US)

( * ) Notice: Subject to any disclaimer, the term of this patent is extended or adjusted under 35 U.S.C. 154(b) by 236 days.

(21) Appl. No.: 15/187,402

(22) Filed: Jun. 20, 2016

(51) Int. Cl.
*G06F 17/30* (2006.01)

(52) U.S. Cl.
CPC .... *G06F 17/30256* (2013.01); *G06F 17/3053* (2013.01); *G06F 17/30091* (2013.01); *G06F 17/30106* (2013.01); *G06F 17/30112* (2013.01); *G06F 17/30271* (2013.01)

(58) Field of Classification Search
CPC ......... G06F 17/30265; G06F 17/30091; G06F 17/30106; G06F 17/30112; G06F 17/30271; G06F 17/3053
See application file for complete search history.

(56) References Cited

U.S. PATENT DOCUMENTS

| | | | |
|---|---|---|---|
| 2014/0105505 A1* | 4/2014 | Ioffe | G06K 9/4676 382/197 |
| 2015/0169631 A1* | 6/2015 | Gu | G06F 17/30244 707/723 |
| 2016/0078057 A1* | 3/2016 | Perez de la Coba | G06F 17/30256 707/772 |
| 2016/0196350 A1* | 7/2016 | Mau | G06F 17/30256 707/706 |

\* cited by examiner

*Primary Examiner* — Van H Oberly
(74) *Attorney, Agent, or Firm* — McDermott Will & Emery LLP

(57) ABSTRACT

Methods for identifying visual portions of visual media files that are responsive to at least one visual media input file submitted as a search query are provided. In one aspect, a method includes generating an index of visual portions of a plurality of visual media files from a collection of media files, and receiving from a user a search query, for the collection, including at least one visual media input file. The method also includes analyzing the index to identify at least one responsive visual media file from the collection that includes a visual portion associated with a visual similarity score, to the at least one visual media input file, which exceeds a similarity threshold value, and providing, in response to the search query, an identifier of the at least one responsive visual media file for display as responsive to the search query. Systems and machine-readable media are also provided.

13 Claims, 8 Drawing Sheets

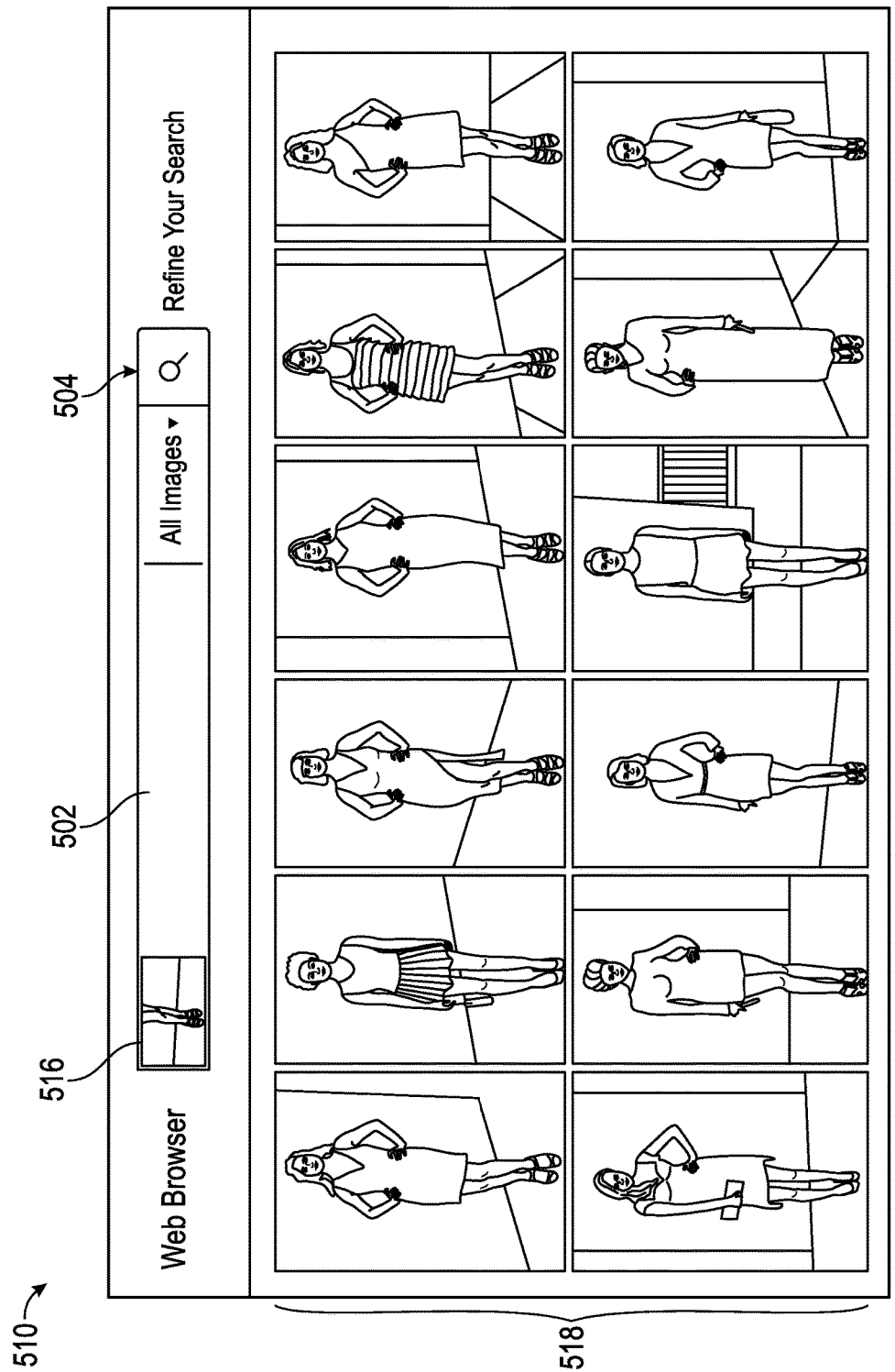

IDENTIFYING VISUAL PORTIONS OF VISUAL MEDIA FILES RESPONSIVE TO VISUAL PORTIONS OF MEDIA FILES SUBMITTED AS SEARCH QUERIES

BACKGROUND

Field

The present disclosure generally relates to identifying portions of individual data files stored in a data file repository as responsive to portions of individual data files used as search queries submitted to the data file repository.

Description of the Related Art

Network accessible data file repositories for content commonly hosted on server devices ordinarily provide users of client devices with the ability to access search algorithms for searching and accessing content of the data files in the data file repositories. For example, for a network accessible media content repository with a large volume of data files, such as for images and videos, a user that seeks to search for media related to cats may provide a specific image file of a cat into a search interface for the network accessible media content repository accessible by and displayed on the user's client device. Image files that are identical to the image file of the cat provided by the user using the search interface may then be returned to the client device for display to the user, while other media that may include images or illustrations of the same cat, a similar looking cat, or the same image of the cat provided by the user as part of a larger image file are determined not be responsive to the search query because they are not identical to the image file of the cat provided by the user using the search interface.

SUMMARY

The disclosed system provides for receiving visual media input files (e.g., images or visual portions of images) as a search submission, and then identifying visual portions (e.g., crops) of visual media files (e.g., images) in a collection of media files that are visually similar to the visual media input files. The identification can be made with reference to an index that indexes the visual portions of visual media files in the collection in advance of receiving the search submission.

According to certain aspects of the present disclosure, a computer-implemented method for identifying visual portions of visual media files that are responsive to at least one visual media input file submitted as a search query is provided. The method includes generating an index of visual portions of a plurality of visual media files from a collection of media files, and receiving from a user a search query, for the collection of media files, including at least one visual media input file. The method also includes analyzing the index of visual portions of the plurality of visual media files from the collection of media files to identify at least one responsive visual media file from the collection that includes a visual portion associated with a visual similarity score, to the at least one visual media input file, which exceeds a similarity threshold value, and providing, in response to the search query, an identifier of the at least one responsive visual media file from the collection of media files for display as responsive to the search query.

According to certain aspects of the present disclosure, a system for identifying visual portions of visual media files that are responsive to at least one visual media input file submitted as a search query is provided. The system includes a memory including instructions, and a processor. The processor is configured to execute the instructions to generate an index of data vectors generated for each visual portion of a plurality of visual media files from a collection of media files, and receive from a user a search query, for the collection of media files, including at least one visual media input file. The processor is also configured to execute the instructions to analyze the index of visual portions of the plurality of visual media files from the collection of media files to identify at least one responsive visual media file from the collection that includes a visual portion associated with a visual similarity score, to the at least one visual media input file, which exceeds a similarity threshold value, and provides, in response to the search query, an identifier of the at least one responsive visual media file from the collection of media files for display as responsive to the search query.

According to certain aspects of the present disclosure, a non-transitory machine-readable storage medium including machine-readable instructions for causing a processor to execute a method for identifying visual portions of visual media files that are responsive to at least one visual media input file submitted as a search query is provided. The method includes cropping at least a visual portion of each of a plurality of visual media files from a collection of media files, and generating a data vector for each cropped visual portion for each of the plurality of visual media files. The method also includes determining a visual similarity between the data vector for each cropped visual portion of each of the plurality of visual media files and a reference data vector representative of at least one reference visual media file associated with at least one known object, and when the visual similarity between the data vector for the cropped visual portion of one of the plurality of visual media files and the reference data vector exceeds a similarity threshold value, associating metadata for the at least one known object with the cropped visual portion of one of the plurality of visual media files and indexing the cropped visual portion of the one of the plurality of visual media files with the associated metadata in an index. The method further includes comparing each of the cropped visual portions of the plurality of visual media files to one another to identify at least two cropped visual portions that when compared have a visual similarity score that exceeds another similarity threshold value, and removing at least one of the at least two cropped visual portions from the index when the compared at least two cropped visual portions have a visual similarity score that exceed the another similarity threshold value, and receiving from a user a search query, for the collection of media files, including at least one visual media input file. The method yet further includes analyzing the index of visual portions of the plurality of visual media files from the collection of media files to identify at least one responsive visual media file from the collection that includes a visual portion associated with a visual similarity score, to the at least one visual media input file, which exceeds a similarity threshold value, and generating an input data vector for the at least one visual media input file. The method also includes performing a dot product between the input data vector for the at least one visual media input file with the data vector for each cropped visual portion for each of the plurality of visual media files to generate a dot product similarity score for each cropped visual portion for each of the plurality of visual media files, identifying a data vector for at least one responsive visual media file having a dot product similarity score exceeding a dot product similarity threshold value as being similar to the at least one visual media input file, and providing, in response to the search query, an identifier of the at least one responsive visual media file from the collection of media files for display as responsive to the search query.

According to certain aspects of the present disclosure, a system for identifying visual portions of visual media files that are responsive to at least one visual media input file submitted as a search query is provided. The system includes means for generating an index of visual portions of a plurality of visual media files from a collection of media files, and means for receiving from a user a search query, for the collection of media files, including at least one visual media input file. The means for identifying further includes analyzing the index of visual portions of the plurality of visual media files from the collection of media files to identify at least one responsive visual media file from the collection that includes a visual portion associated with a visual similarity score, to the at least one visual media input file, which exceeds a similarity threshold value. The means for receiving further includes providing, in response to the search query, an identifier of the at least one responsive visual media file from the collection of media files for display as responsive to the search query.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 5A-5B are example illustrations associated with the example processes of FIGS. 3A and 3B.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system provides for receiving search queries for which the input is visual media files, namely any combination of entire visual media files or portions of visual media files, and then identifying visual portions of entire visual media files from a collection of media files as being responsive to the input visual media files submitted as the search queries. As discussed herein, a visual media file is a file intended to be displayed visually, such as an image, video recording (with or without audio), or visual multimedia (e.g., slideshows), and a "visual portion" of an entire visual media file is a displayed portion of a greater visual media file, such as a cropped portion of an image. The entire visual media files can be divided or otherwise apportioned into the visual portions based on various techniques such as a sliding window algorithm, and further optimized by techniques such as object recognition, visual similarity analysis, and past user behavior. Once relevant visual portions of visual media files are identified as responsive to the input visual media files of the search query, identifiers (e.g., thumbnails, bounding boxes, etc.) of the visual portions of the visual media files can be provided for display in response to the search query.

The disclosed system addresses the technical problem of identifying, for one or several input visual portions of media files or entire visual media files, data files from a data file repository that are each responsive to one or several of the input visual media files by improving a technical solution associated with the technical problem, namely the technical solution of identifying data files from the data file repository as being responsive based on relevance. The technical solution includes the analysis of different portions of each data file, namely each media file from the collection of media files, to determine whether the portions are responsive to the various input visual media files of the search query.

By returning visual portions of visual media files as responsive to the various input visual media files of the search query, various advantages are achieved. These advantages include, for example, increasing the relevance of visual media files identified as responsive to the search query by including visual portions of the same or different visual media files as responsive that would not otherwise, as an entire visual media file, be considered responsive to the search query.

Figure 1:
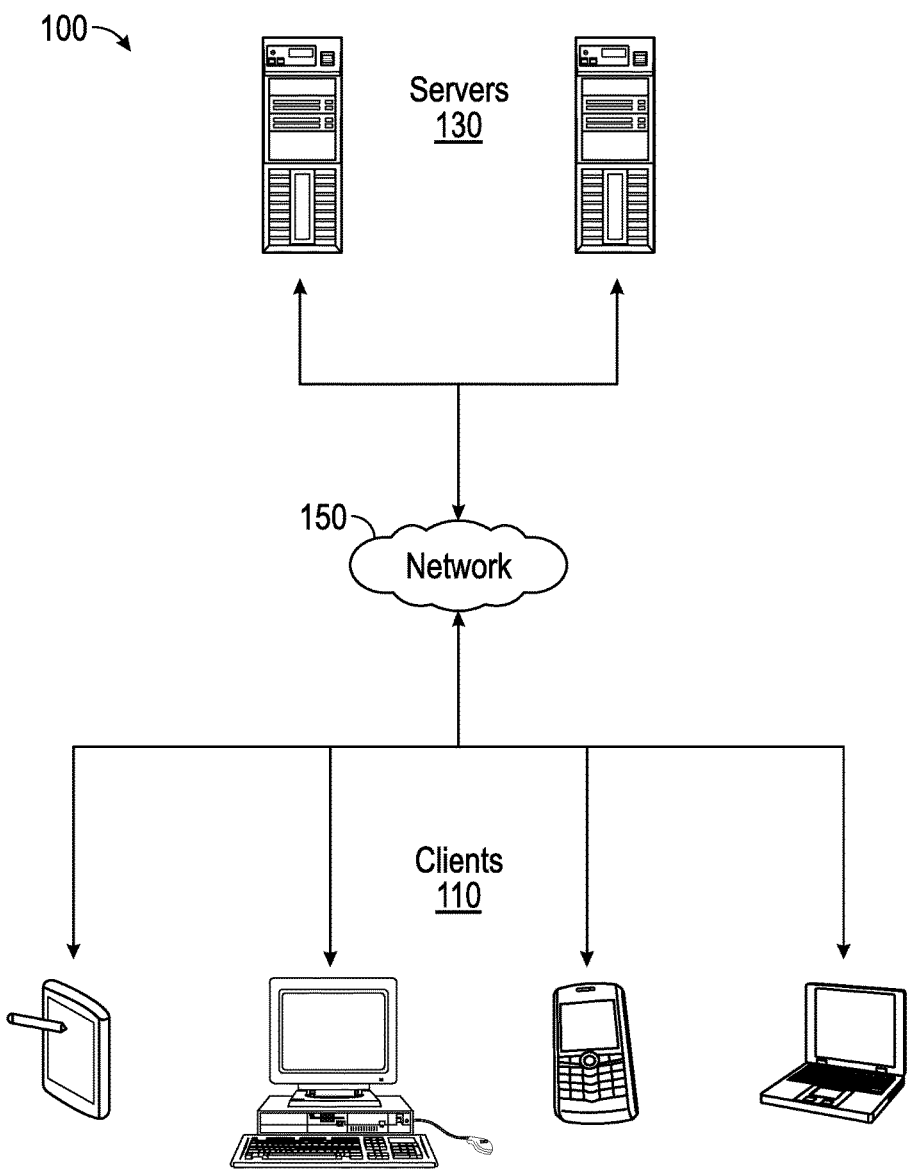
FIG. 1 illustrates an example architecture for identifying visual portions of visual media files that are responsive to at least one visual media input file submitted as a search query.

FIG. 1 illustrates an example architecture 100 for identifying visual portions of visual media files that are responsive to at least one visual media input file submitted as a search query. The architecture 100 includes servers 130 and clients 110 connected over a network 150.

One of the many servers 130 is configured to host a media file portion identifier, a collection of media files, and a media file search engine. For purposes of load balancing, multiple servers 130 can host the media file portion identifier, the collection of media files that includes visual media files, and the media file search engine. In certain aspects, however, visual media files and corresponding data vectors, if existing, may be provided over the network 150 from other devices, such as devices owned by users that generate the media files for consumption.

The servers 130 can be any device having an appropriate processor, memory, and communications capability for hosting the media file portion identifier, the collection of media files, and the media file search engine. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

The disclosed system, which may be available via one or many of the servers 130, provides for the identification of visual portions of visual media files from a collection of media files as relevant to search queries for which the input is one or many visual media files ("visual media input files"). Subsequently, in response to the submission on one of the clients 110 of copies or links of the visual media input file(s) to a search engine to search the collection of media files, the disclosed system retrieves and provides identifiers of visual portions of visual media files responsive to the submitted search query for display in response to the search query. Identifiers of entire media files responsive to the submitted search query can also be provided for display by the disclosed system in response to the search query. The visual portions of the media files can be analyzed using various techniques and information, including, for example, object recognition, visual similarity analysis, or past user behavior (e.g., past or current user provided information associating a portion of an image as associated with a keyword or object).

Figure 2:
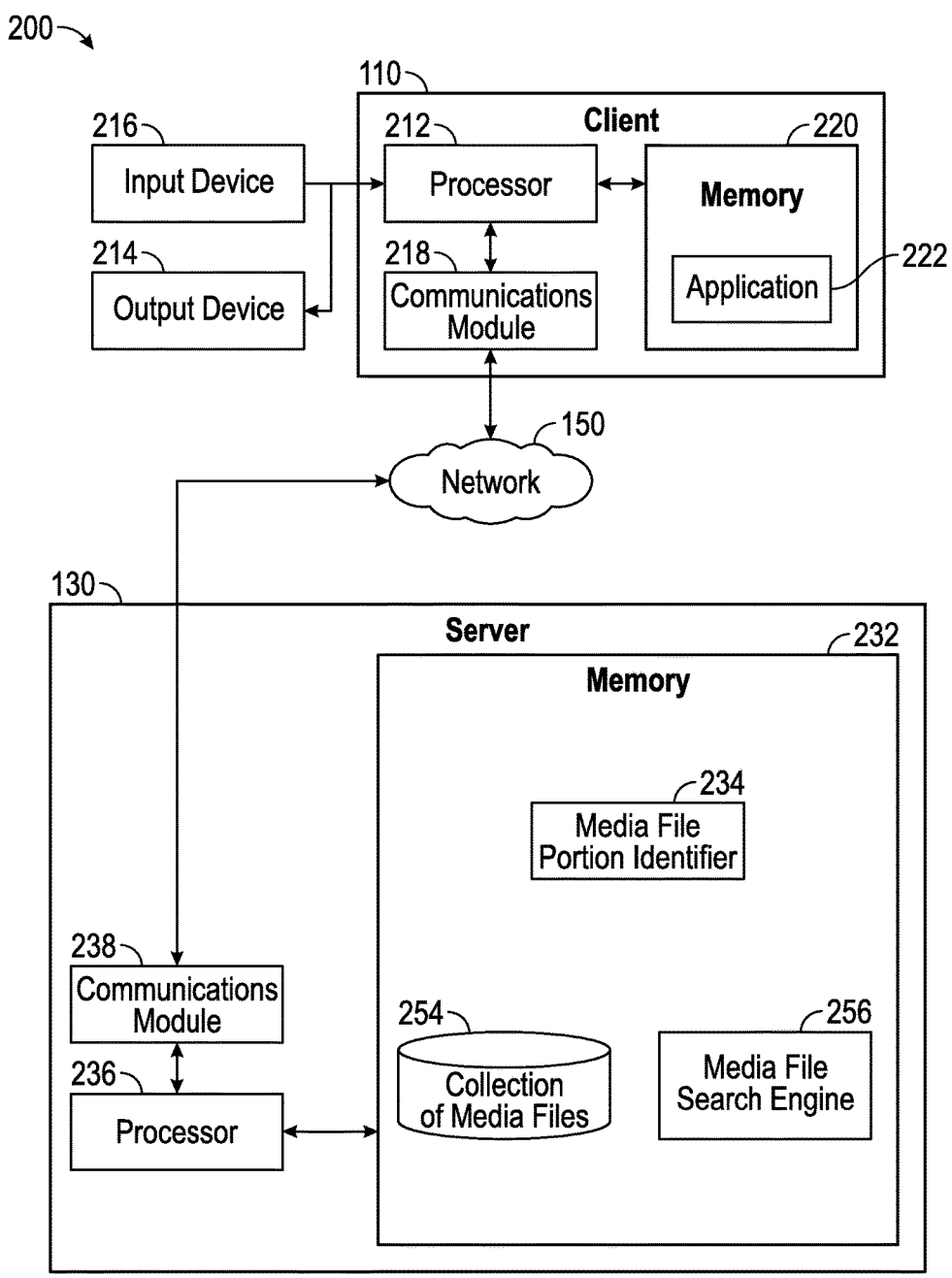
FIG. 2 is a block diagram illustrating an example client and server from the architecture of FIG. 1 according to certain aspects of the disclosure.

FIG. 2 is a block diagram illustrating an example server 130 and client 110 in the architecture 100 of FIG. 1 according to certain aspects of the disclosure.

The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes a media file portion identifier 234, a collection of media files 254, and a media file search engine 256.

The collection of media files 254 includes visual media files (e.g., files intended to be displayed visually) such as images, video recordings with or without audio, and visual multimedia (e.g., slideshows). In certain aspects the collection of media files 254 also includes a dense vector for each visual media file (or "data vector") in the collection of media files 254, and each visual media file in the collection of media files 254 is mapped to its corresponding dense vector representation using a unique index value for the media file that is listed in an index. The data vectors can be for both entire visual media files and visual portions of visual media files, as described in further detail below. The dense vector representation of a visual media file (e.g., a 256 dimensional vector) captures the visual nature of the corresponding visual media file (e.g., of a corresponding image). The dense vector representation of a visual media file is such that, for example, given a pair of dense vector representations for a corresponding pair of images, similarity calculations, such as by using a cosine similarity algorithm, can meaningfully capture a visual similarity between the images. In certain aspects, each dense image vector can be normalized (e.g., to be the same scale) prior to later processing, e.g., prior to applying the cosine similarity algorithm to each dense image vector, in order to expedite such later processing.

A convolutional neural network can be used to train a model to generate dense vector representations for visual media files, such as for images, and map each visual media file to its corresponding dense vector representation in a dense vector space, wherein distance can be calculated between points associated with the dense vector representations in the dense vector space. The convolutional neural network can be a type of feed-forward artificial neural network where individual neurons are tiled in such a way that the individual neurons respond to overlapping regions in a visual field. The architecture of the convolutional neural network may be in the style of existing well-known image classification architectures such as AlexNet, GoogLeNet, or Visual Geometry Group models. In certain aspects, the convolutional neural network consists of a stack of convolutional layers followed by several fully connected layers. The convolutional neural network can include a loss layer (e.g., softmax or hinge loss layer) to back propagate errors so that the convolutional neural network learns and adjusts its weights to better fit provided image data.

The media file search engine 256 is configured to receive one or many visual media input files as search query input for searching the collection of media files 254, and provide an identification of visual media files having visual portions (with the assistance of media file portion identifier 234) that are responsive to the visual media input files of the search queries. In certain aspects, the media file search engine 256 references an index of the media files in the collection of media files 254 in order to facilitate faster identification of media files having visual portions responsive to the visual media input files of the search queries. As discussed herein, the index includes identifiers and other information for both entire visual media files from the collection of media files 254, and visual portions of the entire visual media files from the collection of media files 254.

The processor 236 of the server 130 is configured to execute instructions, such as instructions physically coded into the processor 236, instructions received from software in memory 240, or a combination of both. For example, the processor 236 of the server 130 executes instructions from the media file portion identifier 234 to generate an index of visual portions of visual media files from the collection of media files 254. In certain aspects, the generated index of visual portions of visual media files from the collection of media files 254 is an index of data vectors generated for each of the visual portions of the visual media files from the collection 254. The index can be generated by, for example, first cropping multiple visual portions of each of the visual media files from the collection 254.

Visual media files from the collection of media files 254 can be apportioned into visual portions according to various approaches. For example, in certain aspects, the visual portions of the visual media files can be apportioned based on previous receipt from a user of an identification of visual portions of visual media files as responsive to a query term with reference to, for example, previous user behavior. For example, the media file portion identifier 234 can obtain historical data of users actions related to cutting or otherwise cropping out visual portions of visual media files in the collection of media files 254 using graphic editing software, and a query term can be identified from actions taken by the user during that time (e.g., from the name of the file the user creates to save the visual portion of the visual media file).

As yet another example, the media file portion identifier 234 can search for existing crops or visual portions of visual media files from the collection of media files 254, such as by crawling or otherwise searching the Internet (e.g., for portions of images displayed on web pages), and use the visual portions of the images from the collection of media files 254 that appear on the Internet along with the words with which they are associated (e.g., words in the web pages in which they appear) as a basis for identifying relevant portions of the images as responsive to query terms.

As another example of how visual portions of visual media files can be identified based on user behavior, a heat map of areas of images that prior users have found interesting can be generated using past cropping behavior for visual media files from the collection of media files 254. For example, images can be clustered together to group similar looking images, and a heat map can be generated for the clustered images that identifies portions of those images that users have either been cropped out previously, or responded to in previous searches.

As a further example of how visual portions of visual media files can be identified based on user behavior, a previous submission by a user of a portion of a visual media file (e.g., a crop of an image) can be stored.

For each of these user behavioral approaches, past user behavior can be analyzed to predict a portion of a visual media file that a user is likely to crop. Furthermore, past user behavior can also be analyzed to determine sizes and shapes of portions (crops) of the images that are more likely to result in portions of images with sizes and shapes that are responsive to search queries.

Data vectors for each of the media files can be clustered into a predetermined number of clusters according to a clustering algorithm, for example, using k-means clustering. For example, the data vectors for the media files from the collection of the media files 254 can be assigned to clusters by the clustering algorithm based on a similarity threshold. The number of clusters can be manually selected, such as, for example, designating that the collection of the media files 240 be divided into 1000 clusters. The data vectors for the media files from the collection 240 can be designated to belong to one of the clusters based on a similarity threshold using a clustering algorithm. The similarity threshold can indicate visual similarity, conceptual similarity, keyword similarity, or another measurement of similarity between media files. Other clustering algorithms can also be used, including other methods of vector quantization, or other clustering approaches such as affinity propagation clustering, agglomerative clustering, Birch clustering, density-based spatial clustering of applications with noise (DB-SCAN), feature agglomeration, mini-batch k means clustering, mean shift clustering using a flat kernel, or spectral clustering.

As another example, the media file portion identifier 234 can obtain historical data of users actions related to identifying images displayed in search results for a previously submitted search query, and select subsets or portions of those images in the search results to be submitted in a reverse image search as described in U.S. patent application Ser. No. 15/054,025, titled "Selected Image Subset Based Search", and filed on Feb. 25, 2016, the contents of which are incorporated for reference purposes herein in their entirety. In certain aspects, the terms of the previously submitted search query can be considered as a basis for the query term associated with the visual portions of the images submitted in the reverse image search.

As a further example, the media file portion identifier 234 can perform object detection and/or edge detection on each of the visual media files in the collection of media files 254 to identify regions of the visual media files for cropping into visual portions. For example, a detected face or landscape in a visual media file can be used to anchor a region that is likely to be a useful visual portion of a visual media file. As yet another example, for edge detection, once salient edges in a visual media files are identified, the media file portion identifier 234 can additionally use object detection to determine any object identified by the detected edges of the visual media file.

In certain aspects, after the media file portion identifier 234 has identified visual portions of visual media files, the visual portions of the visual media files can be rotated to be normalized along one or several different axes so that the visual portions can subsequently be more accurately be compared to visual media input files and their respective axes from a search query for visual similarity. In certain aspects, the original rotation of the visual portion can be given a higher weight than the other rotations of the visual portion. In certain aspects, the visual portions of the visual media files can be rotated to be normalized along a single reference axis, and when visual media input files from a subsequent search query are received, those visual media input files can be rotated to be along the same reference axis for more accurate visual similarity comparison (e.g., of the respective data vectors generated from the visual portions of the visual media files and the visual media input files). For example, for a visual media input file that is a cropped image of a purse taken from an entire image file of a celebrity holding the purse, the cropped image of the purse can be rotated to be along a predetermined reference axis and the rotated cropped image of the purse can then be used for searching the collection of media files 254 visually similar images.

A data vector can then be generated and optionally normalized as described above for each cropped visual portion of each visual media file. Thus, for example, for each visual media file from the collection of media files 254, where each visual media file is cropped in different visual areas and/or with different crop sizes, multiple data vectors can be generated. Specifically, the visual portion of the visual media file can be submitted (e.g., by the media file portion identifier 234) to the convolutional neural network (e.g., during a forward pass) to generate a data vector for the visual portion of the visual media file. The data vector can be compared to data vectors for other visual media files (e.g., individual complete visual media files) from the collection 254 to identify visual similarity. If the visual similarity between the data vector for the visual portion of the visual media file and a data vectors for another visual media file from the collection 254 exceeds a similarity threshold, then the visual portion of the visual media file can be associated with the same or similar metadata (e.g., keywords, search query terms) as the other visual media file from the collection 240 to which it is deemed sufficiently similar. The visual portion of the visual media file can then be stored in the collection of media files 254 as a separate file and indexed as discussed above.

Then, with reference to multiple reference data vectors, each representative of at least one reference visual media file associated with at least one known object, a visual similarity is determined between the data vector for each cropped visual portion of each visual media file and each reference data vector representative.

Visual similarity between the data vector for a visual portion of a visual media file and data vectors for the other visual media files can be assessed using various approaches including, for example, image clustering or object detection. With reference to using object detection to assess visual similarity, in certain aspects, the processor 236 is configured to identify portions of the plurality of visual media files responsive to the group of search queries by first performing object detection for each of the plurality of visual media files to, for example, identify objects in portions of the visual media files, and then determine whether the detected objects are responsive to the search queries. For instance, a visual media file from the collection of media files 254 is provided to a convolutional neural network as described above that has been trained to identify objects in visual media files (e.g., images).

In certain aspects, object detection can be performed by generating a data vector for each cropped portion for each visual media file, and determining a visual similarity between the data vector for each cropped portion and a reference data vector for at least one reference visual media file either associated with at least one known object or known to be responsive to one or more search queries. For example, the reference data vector can be a centroid of several data vectors for visual media files that are clustered together for a known object based on visual similarity to one another. As another example, attentional models (e.g., which area of an image a person would commonly pay attention to) can be used to identify visual portions of visual media files in the collection of media files 254 to be cropped out. Each visual media file from the collection of media files 254 can be cropped using various approaches in order to generate the cropped portions, including, for example, dividing the visual media file into subsets portion using an optional sliding window approach. In a sliding window approach, a rectangular region of fixed width and height that "slides" across an image from the visual media file, and for each window region (or "portion" or "cropped portion") a data vector is generated to determine if the window has a recognizable object (which in certain aspects would be a filter for retaining the content of the window, while in other aspects all windows are retained). The sliding window can be configured with a parameter for step size, which is how many pixels are to be skipped in both the (x, y) direction of the image. Step size can be determined on a per-dataset basis and tuned to give optimal performance based on the visual media files in the collection of media files 254. For example, step size can commonly be between 4 to 10 pixels. Step size can also be different for horizontal steps as opposed to vertical steps. Another parameter that can be adjusted is the window size, which defines the width and height in pixels of the window that is to be extract from the image taken from the visual media file. Additionally, in certain aspects, window sizes can be determined with reference to commonly appropriate sizes for capturing common objects, such as heads (e.g., a square shape) or full bodies (e.g., a narrow rectangular shape).

In order to determine a visual similarity between the data vector for each cropped portion of an image and a reference data vector for a reference image associated with at least one known object, data vectors for each of the visual media files in the collection 254, including image files, are generated using the convolutional neural network described above, and the data vectors are then clustered into a predetermined number of clusters according to a clustering algorithm based on a similarity threshold. The clustering algorithm can be, for example, a k-means clustering or another method of vector quantization. The number of clusters can be manually selected, such as, for example, designating that the collection of the media files 254 be divided into 1000 clusters. The data vectors for the visual media files from the collection 254 can be designated to belong to one of the clusters based on a similarity threshold using a clustering algorithm. The similarity threshold can indicate visual similarity, conceptual similarity, keyword similarity, or another measurement of similarity between visual media files. In certain aspects, if the visual similarity between the data vector for a cropped portion of a visual media file and a reference data vector for a reference visual media file associated with at least one known object is deemed to be sufficiently similar (e.g., exceeding a similarity threshold value), then the metadata for the known object can be associated with the cropped portion of the visual media file. Additionally, the metadata for the known object can also be associated with the entire visual media file from which the visual portion of the visual media file was obtained. The visual portion of the visual media file can then be stored in the collection of media files 254 as a separate file and indexed as discussed above. For example, if an object is identified by the convolutional neural network in a visual media file, the object is cropped to generate a portion of the visual media file. The object can be cropped using various approaches, such as by create a bounded box that has an average of a 10% bounded space around the object.

The stored portion of the visual media file can be, for example, a listing of coordinates in the entire visual media file that form the boundaries of the visual portion of the visual media file responsive to the query term and associated with the search query. Alternatively, the stored portion of the visual media file can be, for example, a separate copy of the visual portion of the visual media file that is then stored in the collection of media files 254 as a separate file than the visual media file from which it is taken or copied. In these aspects, the separate copy of the visual portion of the visual media file that is then stored in the collection of media files 254 as a separate file can be associated with a data vector generated for the file, and indexed for use with the media file search engine 256.

When stored in the index, the data vector for a visual portion of a visual media file can include information identifying which visual media file from the collection of media files 254 the data vector represents a visual portion of, and where in the visual media file the portion is taken from. For example, for a visual media file A that is 1600×2400 pixels, a data vector representing a visual portion of the media file is stored in the index identifying it is a visual portion of file A between pixel location points (400, 200), (800, 200), (400, 600), and (800, 600). The data vector for a visual portion of a visual media file can also be stored in the index with a performance score indicative of how likely the visual portion is to be responsive to a search query. For example, a visual portion of a visual media file taken from the bottom left of the visual media file is likely to be less relevant to a search query than a visual portion of the visual media file taken from the center of the visual media file, and thus the visual portion taken from the bottom left of the visual media file can have a lower score than the visual portion taken from the center of the visual media file. Similarly, if a first visual portion of a visual media file is more likely to include, based on object recognition, a known object than a second visual portion of the visual media file or another visual media file, then the first visual portion of the visual media file can be indexed with a higher performance score than the second visual portion.

In certain aspects, the index can be optimized to remove similar looking visual portions of visual media files that might be cropped from the same or different visual media files (e.g., multiple crops of white space, similar or identical crops of the same shoes, etc.). For example, each of the cropped visual portions of the visual media files from the collection of media files 254 are compared to one another to identify at least two cropped visual portions that, when compared, have a visual similarity score that exceeds a similarity threshold value for identifying substantially identical images (e.g., 98% similarity), and one or all duplicate cropped visual portions from the comparison are removed from the index when the visual similarity score that exceeds the similarity threshold value for the compared cropped visual portions. Additionally, in certain aspects, the index can be optimized to remove visual portions of visual media files that include visually appearing objects similar to recognized objects users are not likely to search for.

The processor 236 of the server 130 is also configured to receive, from a user of the client 110, a search query for the collection of media files. The search query can be provided by the user using an input device 216 of the client 110 in a graphical user interface for an application 222, displayed on an output device 214 of the client 110, stored in the memory 220 of the client 110 and run using a processor 212 of the client 110. The application 222 can be, for example, a web browser, a mobile app, or other software application for receiving a media file search query for the collection of media files 254. The search query can be provided by the client 110 to the media file search engine 256 on the server 130 over the network 150 using respective communications modules 218 and 238 of the client 110 and server 130, respectively.

The search query provided by the user can include one or many visual media input files. For example, using a graphical user interface of the application 222, such as an upload interface, the user can provide one or several visual media input files (e.g., images) the user would like the media file search engine 256 to search the collection of media files 254 to identify visual media files in the collection 254 that have visual portions that appear visually similar to or the same as the visual media input files. In certain aspects, the user can also be permitted to select portions of visual media files displayed to the user, and have those selected portions used by the media file search engine 256 as the visual media input files to search the collection of media files 254. The visual media input files can be entire visual media files (e.g., entire image files) or visual portions of entire visual media files (e.g., crops of entire image files). A data vector for each visual media input file ("input data vector") can be generated using the convolutional neural network discussed above. Additionally, each visual media input file can itself be broken into visual portions using the visual portion identification techniques described above, and each of the following steps described with reference to a visual media input file can be performed for each of the visual portions into which the visual media input file is apportioned.

The processor 236 of the server 130 is further configured to analyze the index to identify at least one responsive visual media file from the collection 254 that includes a visual portion associated with a visual similarity score, to the visual portion of the visual media input file(s) of the search query from the user, which exceeds a similarity threshold value.

The visual similarity score generated for each visual media input file and visual portion pairing can be generated according to various approaches.

For example, in one approach, the visual similarity score is a dot product similarity score and the similarity threshold value is a dot product similarity threshold value. In this approach, a dot product is performed between an input data vector generated for each visual media input file and the data vector for each visual portion of each visual media file from the collection 254 to generate a dot product similarity score for each visual media input file and visual portion pairing. Data vectors for visual portions of visual media files that are identified as having a dot product similarity score exceeding a dot product similarity threshold value are considered sufficiently similar to the visual media input file of the pairing.

In certain aspects, the dot product similarity score can be weighted. For example, the processor 236 can compute a distance (e.g., in dense vector space) between the input data vector for each visual media input file and centroids of clusters for other input data vectors from previous search queries (e.g., a cluster for "cat" images submitted in previous search queries), and when the distance between the input data vector for a visual media input file and at least one centroid of a cluster for other input data vectors is below a distance threshold, the input data vector (i.e., for the visual media input file) is assigned to the cluster (e.g., if a visual media input file is considered near the centroid for the cat images cluster with reference to the distance threshold, then the visual media input file is assigned to the cat images cluster). In these aspects, the centroid of the cluster is a behavioral data centroid in that it is an average of the data vectors associated with past visual media input files of previous search queries. A related data structure can be built for each behavioral data centroid that associates each behavioral data centroid to a map. The map has as a key a visual media file that was previously interacted with by a user (e.g., downloaded or clicked on) for one or more of the input images represented in the centroid. The value in the map is a count of the number of times the image was downloaded or clicked for the input image.

In certain aspects, a user can provide a textual query term as part of the search query (i.e., in addition to the visual input files), and the query term can be used as part of the clustering algorithm for which the distance from a centroid is calculated. Thus, the processor 236 can compute a distance between the input data vector for an image input file of a cat with a user provided query "cat", and centroids of clusters for other input data vectors from previous search queries (e.g., a cluster for "cat" images submitted in previous search queries), and when the distance between the input data vector for a visual media input file and at least one centroid of a cluster also associated with the query term "cat" for other input data vectors is below a distance threshold, the input data vector (i.e., for the visual media input file) is assigned to the cluster (e.g., if a visual media input file is considered near the centroid for the cat images cluster with reference to the distance threshold, then the visual media input file is assigned to the cat images cluster). In certain aspects, metadata associated with either a visual media file from the cluster that the visual media input file is closest to with respect to computed distance, or metadata collected from many or all of the visual media files from the cluster, is assigned to the visual media input file when the input data vector for the visual media input file and the centroid of the cluster is below the distance threshold.

The dot product similarity score for the pairing of the visual media input file and the visual portion for a visual media file is then weighted based on a past responsiveness of the corresponding visual portion to the cluster to which the input data vector is assigned. For example, if a visual portion of a visual media file from the collection was considered very responsive (e.g., images actually downloaded or clicked on) to a previously submitted search query from a user using an image from the cat images cluster, then the pairing of the visual media input file and the visual portion of the visual media file is weighted more heavily.

The dot product similarity score for the pairing of the visual media input file and the visual portion for a visual media file can further be weighted based on the distance of the visual media input file from other visual media input files assigned to clusters for other input data vectors from previous search queries. For example, the greater a distance between the visual media input file and another visual media input file from a cluster, then the less the weighting will be for the dot product similarity score for a pairing of the visual media input file and visual portion of a visual media file from the collection 254 previously identified as responsive to the other visual media input file from the cluster.

The dot product similarity score for the pairing of the visual media input file and the visual portion for a visual media file can further be weighted based on a query term provided by a user as part of the search query when providing the visual media input files. For example, if the visual portion for a visual media file is determined, based on, for example past user behavior, not likely to be responsive to the query term with which the visual media input file was submitted, then the associated dot product similarity score for the pairing can be reduced. Similarly, if the visual portion for a visual media file is determined, based on past user behavior, likely to be responsive to the query term with which the visual media input file was submitted, then the associated dot product similarity score for the pairing can be increased.

The processor 236 of the server 130 is also configured to provide, in response to the search query (e.g., of the visual media input file(s) from the user), an identifier of at least one responsive visual media file from the collection of media files 254 for display as responsive to the search query. The responsive visual media files can be sorted in descending order according to a responsiveness score, which can be equal to a visual similarity score, with the responsive visual media files having the highest n visual similarity scores being identified to the user as responsive to the visual media input files of the search query.

In certain aspects where the user search query includes multiple visual media input files, analyzing the index includes identifying one or many visual media files from the collection 254 that include visual portions associated with visual similarity scores to the visual portions of the multiple visual media input files that exceed a similarity threshold value. In other words, if a user provides multiple visual media input files in a search query, the index is analyzed to identify visual media file(s) from the collection 254 that include a visual portion sufficiently similar to as many of the visual media input files as possible, from the range of one visual media file including visual portions sufficiently similar to all of the visual media input files to a visual media file including a visual portion sufficiently similar to just one of the visual media input files. In these aspects, identifiers for these responsive visual media files are each provided with a responsiveness score that is used to sort the identifiers as responsive to the visual media input files of the search query (i.e., an intersection of the dot product similarity score for the dot products between each of the visual media input files and the corresponding responsive visual media file).

In certain aspects, the responsiveness score can be, for example, an intersection of the dot product similarity score for the dot product between each of the visual media input files and the corresponding responsive visual media file. For example, the responsiveness score can be an average of the dot product similarity score for the dot product between each of the visual media input files and the corresponding responsive visual media file (e.g., for two visual media input files matching a single visual media file from the collection 254, the dot product similarity score for each of the two visual media input files is 50% of the responsiveness score), or a sum of the dot product similarity score for the dot product between each of the visual media input files and the corresponding responsive visual media file.

Alternatively, when providing visual media files from the collection of media files 254 that are responsive as an intersection of the visual media input files of the search query, the visual portions identified from the collection 254 used to create the index can further be processed to be grouped into n (e.g., 1000) clusters using the clustering algorithms discussed above. Then, for each visual media input file, a distance of the visual media input file to the centroid of each of the n clusters is computed, and the cluster that has an overall minimum distance from all of the visual media input files is identified as being most responsive to the visual media input files, and the visual media files including the visual portions associated with that cluster are returned as responsive to the visual media input files of the search query. In certain aspects, if the distance of the cluster is nonetheless considered low (e.g., below a distance threshold), then these results identified from this clustering approach can be disregarded and results reflecting a union of the of the dot product similarity score for the dot product between each of the visual media input files and the corresponding responsive visual media file can be provided, as described below.

In certain aspects, the responsiveness score can be, for example, a union of the dot product similarity score for the dot product between each of the visual media input files and the corresponding responsive visual media file, which case the highest dot product similarity score from the multiple visual portions for the single visual media file reflective of the visual similarity between one of the visual media input files of the search query and the corresponding visual media file from the collection 254 for which the visual portion is scored is used to score the relevance of the visual media file to the search query. This is advantageous where, for example, if two or more one visual media input files are submitted in a search query, and no visual media file from the collection 254 includes visual portions responsive to all of the two or more visual media input files. In this case, visual media files from the collection 254 are provided for display as responsive to the search query for individual visual media input files of the search query. For example, if a user submits two visual media input files, namely an image of a purse and an image of a sequins dress, and no image from the collection 254 is identified from the index as including crops sufficiently similar to both the image of the purse and the image of the sequins dress, then images from the collection 254 most responsive to either the image of the purse or the image of the dress are displayed ranked according to their dot product similarity score. In these aspects, union results may follow any intersection results described above.

In certain aspects, if there are multiple visual portions from a single visual media file from the collection 254 identified as having a dot product similarity score exceeding the dot product similarity threshold value discussed above to at least one of the visual media input files, then the highest dot product similarity score from the multiple visual portions for the single visual media file is used as the responsiveness score to rank the relevance of the visual media file to the search query. Additionally, the highest dot product similarity score from the multiple visual portions for the single visual media file can be more heavily weighted, and then used to score the relevance of the visual media file to the search query. Similarly, if a single visual media input file is associated with multiple dot product similarity scores exceeding the dot product similarity threshold value for a single image (e.g., a visual media input file appears multiple times within the single visual media file), then the highest dot product similarity score from the multiple visual portions for the single visual media file can be weighted more heavily and used to score the relevance of the visual media file to the search query.

In certain aspects, the identifiers of the responsive visual media files from the collection of media files 254 that are provided as responsive to the search query can be ranked or filtered based on, for example, inverse document frequency. For instance, if two visual media input files are provided in a search query from a user, and the first of the two visual media input files has dot product similarity scores exceeding a dot product similarity threshold for over 10,000 visual media files from the collection 254, and the second of the two visual media input files has dot product similarity scores exceeding a dot product similarity threshold for 50 visual media files from the collection 254, then identifiers for the visual media files responsive to the first visual media input file can be filtered from the results, and the dot product similarity scores for the visual media files responsive to the second visual media input file can be used as the responsiveness score provided in the results as responsive to the search query.

Figure 3A:
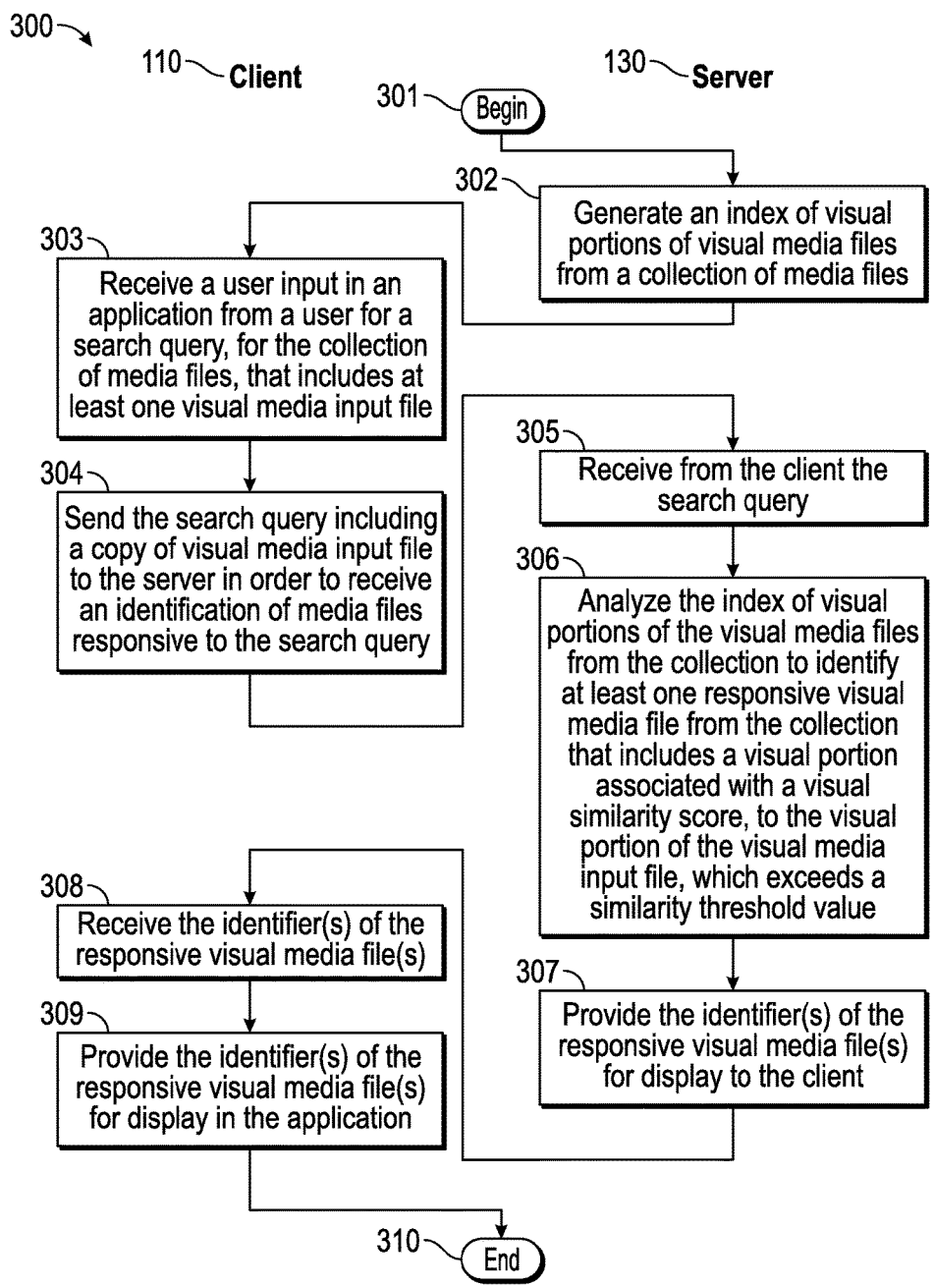
FIG. 3A illustrates an example process for identifying visual portions of visual media files that are responsive to at least one visual media input file submitted as a search query using the example client and server of FIG. 2.

FIG. 3A illustrates an example process 300 for identifying visual portions of visual media files that are responsive to at least one visual media input file submitted as a search query using the example client 110 and server 130 of FIG. 2. While FIG. 3 is described with reference to FIG. 2, it should be noted that the process steps of FIG. 3 may be performed by other systems.

The process 300 begins by proceeding from beginning step 301 when a collection of media files 254 are provided for processing by a media file portion identifier 234 to step 302 on the server 130 when an index of visual portions of visual media files from the collection of media files 254 is generated. A process for generating the index of visual portions of visual media files from the collection of media files 254 is described in further detail below with reference to FIG. 3B. Turning to the client 110, subsequently in step 303, at a later point a user input in an application 222 is received from a user for a search query, for the collection of media files 254, which includes at least one visual media input file. The search query, including a copy of visual media input file, is sent in step 304 to the server 130 in order to receive an identification of media files responsive to the search query.

Turning to the server 130, in step 305, the search query is received from the client 110 and in step 306 the index of visual portions of the visual media files from the collection 254 is analyzed to identify at least one responsive visual media file from the collection 254 that includes a visual portion associated with a visual similarity score, to the visual portion of the visual media input file, which exceeds a similarity threshold value. In step 307, identifier(s) of the responsive visual media file(s) identified in step 306 are provided for display to the client 110. In certain aspects, the identifier(s) include metadata for the responsive visual media file such as the entire visual media file from which a returned visual portion is derived, and the coordinates within the entire visual media file image needed to draw a bounding box around the returned visual portion.

Figure 3B:
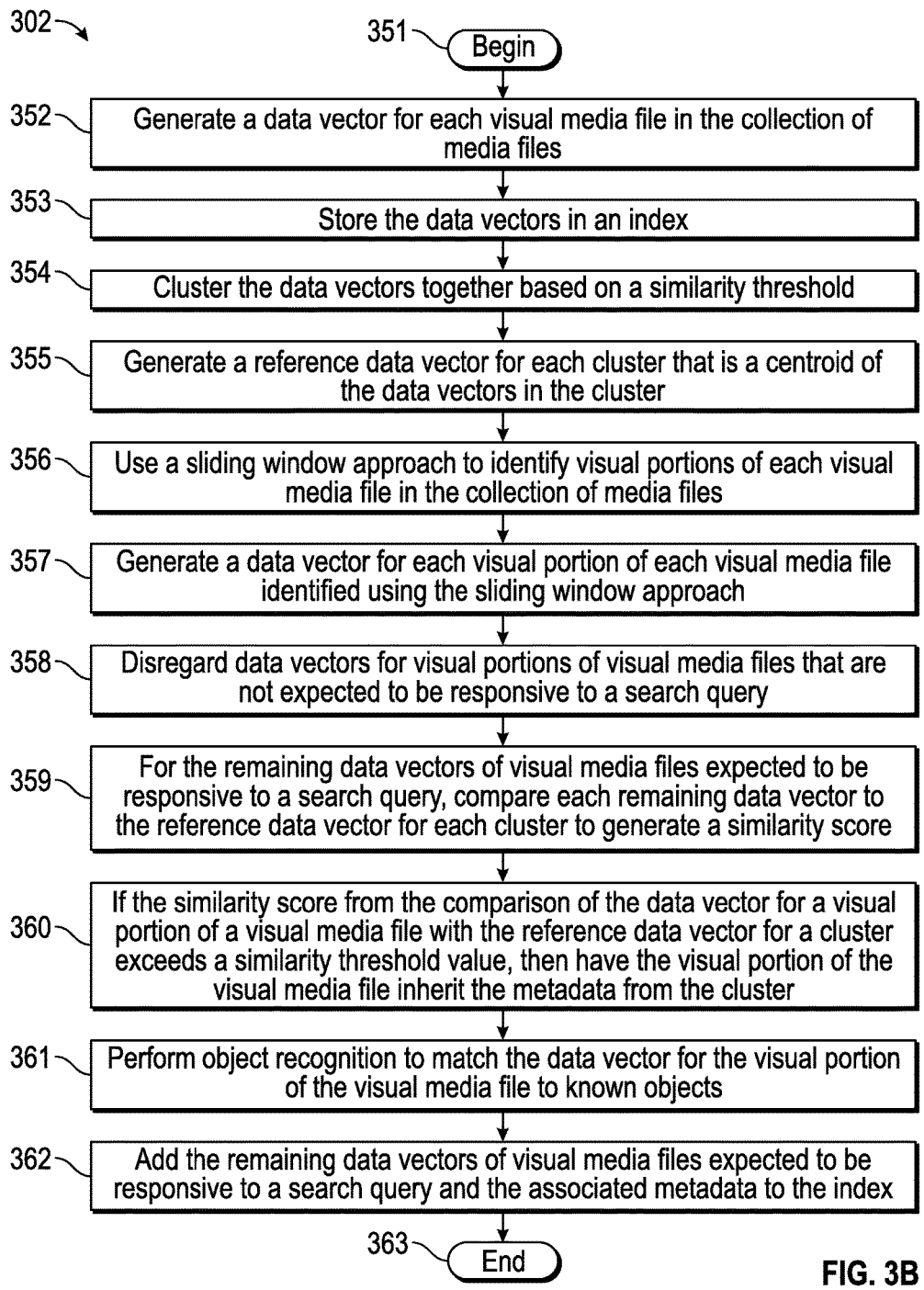
FIG. 3B illustrates from FIG. 3A an example process for generating an index of visual portions of a plurality of visual media files from a collection of media files using the example server of FIG. 2.

FIG. 3B illustrates an example process for step 302 from FIG. 3A for generating the index of visual portions of visual media files from the collection of media files 254. The process 302 begins by proceeding from beginning step 351 to start creating an index of data vectors to step 352 in which a data vector is generated for each visual media file in the collection of media files 254. Next, in step 353, the data vectors are stored in an index, and in step 354 the data vectors are clustered together using k-means, another method of vector quantization, or based on a similarity threshold. In step 355, a reference data vector is generated for each cluster (if not already previously generated) that is a centroid of the data vectors in the cluster, and in step 356 a sliding window approach is used to identify visual portions of each visual media file in the collection of media files 254.

Subsequently, in step 357, a data vector is generated for each visual portion of each visual media file identified using a sliding window approach and in step 358 data vectors for visual portions of visual media files that are not expected to be responsive to a search query are disregarded. In step 359, each remaining data vector is compared to the reference data vector for each cluster to generate a similarity score for the remaining data vectors of visual media files expected to be responsive to a search query, and in step 360, if the similarity score from the comparison of the data vector for a visual portion of a visual media file with the reference data vector for a cluster exceeds a similarity threshold, then the visual portion of the visual media file inherits the metadata from the cluster. In certain aspects, for step 360, when the similarity score exceeds a threshold for multiple reference data vectors (e.g., centroids), then the visual portion of the visual media file can either inherit metadata from the reference data vector associated with the maximum similarity score, or inherit data based on a weighted average of metadata across the different reference vectors with weighting proportional to their respective similarity scores. In step 361, object recognition is optionally performed to match the data vector for the visual portion of the visual media file to known objects, and can be used to remove data vectors not matched with known object, and in step 362 the remaining data vectors of visual media files expected to be responsive to a search query and the associated metadata are added to the index. The process ends in step 363.

FIG. 3A set forth an example process 300 for identifying visual portions of visual media files that are responsive to at least one visual media input file submitted as a search query using the example client 110 and server 130 of FIG. 2. An example will now be described using the example process 300 of FIG. 3, visual media files that are images from the collection of media files 254, visual portions that are crops of the images, a search query of an image of a bowtie submitted in an application 222 that is a web browser on a client 110 that is a desktop computer.

Figure 4:
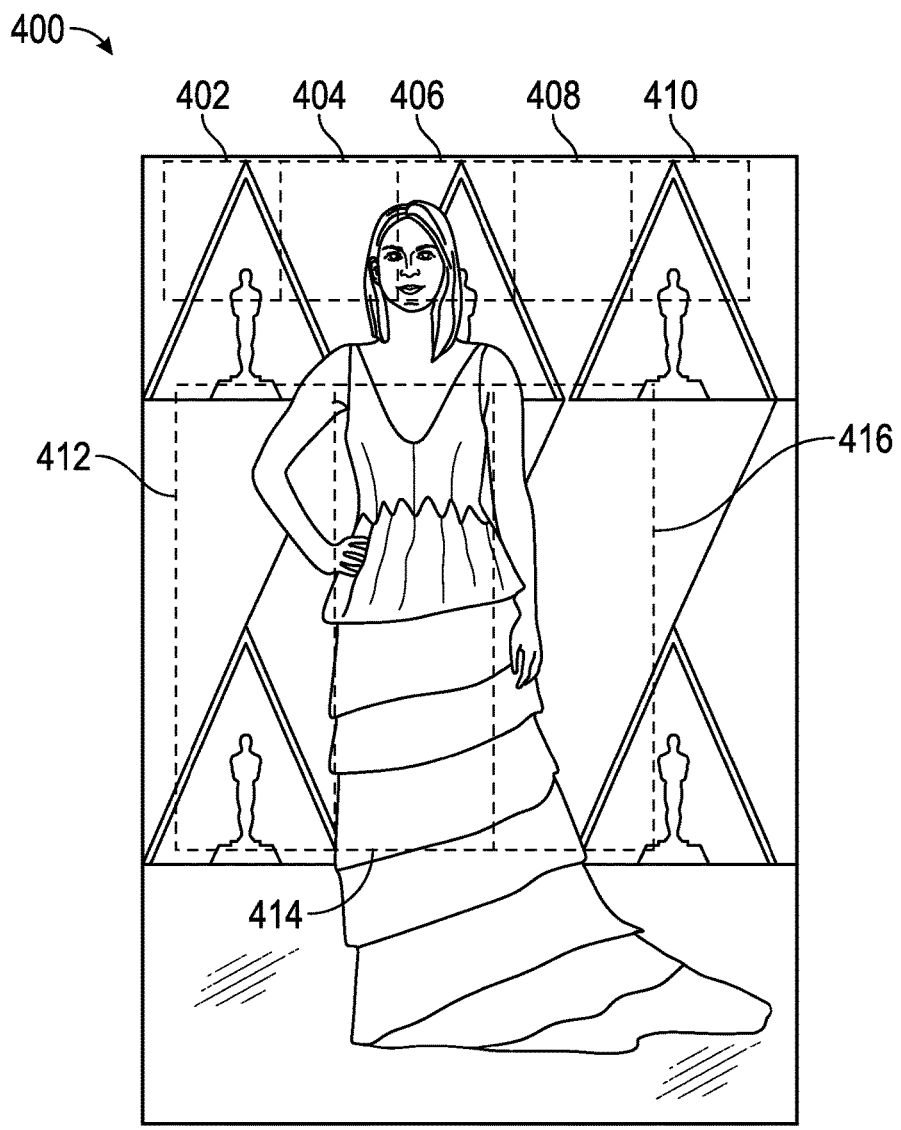
FIG. 4 illustrates an example image from a collection of media files.

The process 300 begins by proceeding from beginning step 301 when the media file portion identifier 234 on the server 130 is either manually or automatically (e.g., in response to a triggering event or on a schedule) initialized to process images from the collection of media files 254 to step 302 when the index of images and crops from the collection of media files 234 is generated in response to the processing by the media file portion identifier. Specifically, with reference to step 302 of FIG. 3B, in step 352 a data vector is generated for each image in the collection of media files 254. Next, in step 353, the data vectors are stored in the index, and in step 354 the data vectors are clustered together using a similarity threshold. In step 355, a reference data vector is generated for each cluster that is a centroid of the data vectors in the cluster, and in step 356 a sliding window approach is used to identify crops of each image in the collection of media files 254. FIG. 4 illustrates an example image 400 from the collection of media files 254. The image 400 includes two sets of indicators, a first set of indicators 402, 404, 406, 408, and 410 reflecting crops of the image 400 being analyzed using a sliding window approach with a first set of window sizes. A second set of indicators 412, 414, and 416 reflects crops of the image 400 being analyzed using the sliding window approach with a second set of window sizes.

Subsequently, in step 357, a data vector is generated for each crop of each image identified using the sliding window approach, including crops 402, 404, 406, 408, 410, 412, 414, and 416 of image 400 from the collection 254, and in step 358 data vectors for crops of images that are not expected to be responsive to a search query are disregarded. In step 359, each remaining data vector is compared to the reference data vector for each cluster to generate a similarity score for the remaining data vectors of images expected to be responsive to a search query, and in step 360, if the similarity score from the comparison of the data vector for a crop of an image with the reference data vector for a cluster exceeds a similarity threshold, then the crop of the image inherits the metadata from the cluster. In step 361, object recognition is optionally performed to match the data vector for the crop of the image to known objects, and can be used to remove data vectors not matched with known object, and in step 362 the remaining data vectors of images expected to be responsive to a search query and the associated metadata are added to the index. The process ends in step 363.

Returning to process 300 of FIG. 3A, and turning to the client 110, subsequently in step 303, at a later point a user submits a search query of an image of a bowtie in a web browser application 222 to be searched against the collection of media files 254. The search query, including a copy of the bowtie image, is sent in step 304 to the server 130 over the World Wide Web network 150 in order to receive an identification of images from the collection of media files 254 visually similar to the bowtie image.

Turning to the server 130, in step 305, the search query of the bowtie image is received from the web browser application 222 on the desktop client 110 over the World Wide Web network 150 and in step 306 the index of crops of the images from the collection 254 is analyzed to identify responsive images from the collection 254 that include crops associated with a visual similarity score, to the crop of the bowtie image, which exceeds a 90% similarity threshold value. In step 307, identifiers, namely the responsive images identified in step 306 are provided for display over the World Wide Web network 150 to the web browser application 222 on the desktop client 110.

Figure 5B:
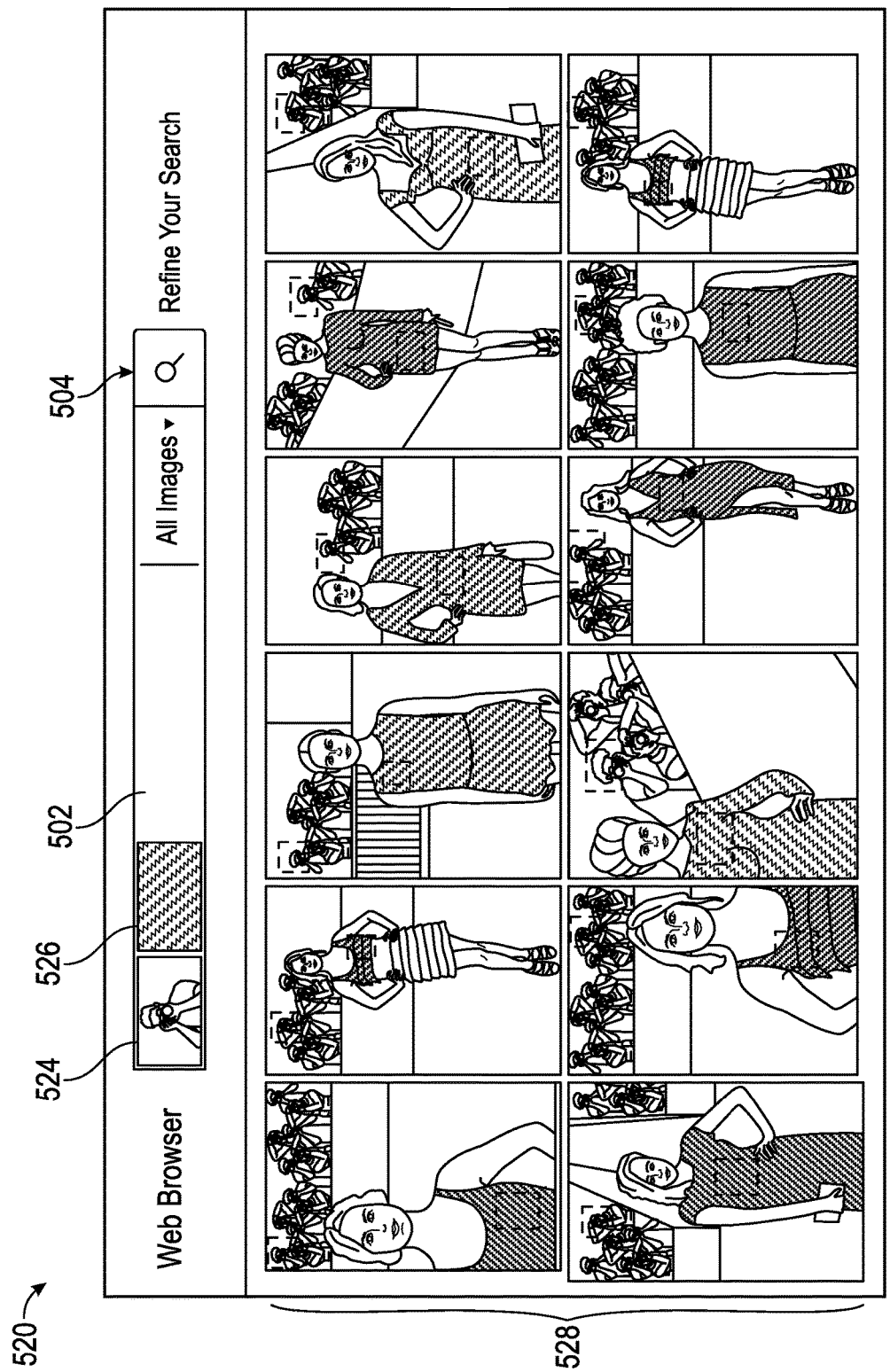

FIGS. 5A and 5B are additional illustrations of visual portions of visual media files displayed as search results responsive to a search query that includes a visual media input file. In the example illustration 510 of FIG. 5A, a web page is displayed that includes a thumbnail image 516 of women's shoes being worn submitted by a user for search and appears in a search submission bar 502 near a search submission button 504. The illustration also displays images 518 from the collection of media files 254 that have been identified as visually similar to the image of women's shoes being worn submitted by the user. In the example illustration 520 of FIG. 5B, a web page is displayed that includes two thumbnail images, a first thumbnail image 524 of a photographer with a camera and a second thumbnail image 526 of a pattern on a dress, submitted by a user for search and appear in a search submission bar 502 near a search submission button 504. The illustration also displays images 528 from the collection of media files 254 that have been identified as each including visually similar crops to both the image of the photographer with a camera and the image of the pattern on a dress, along with rectangular indicators ("bounding boxes") identifying the visually similar crops in the images.

Figure 6:
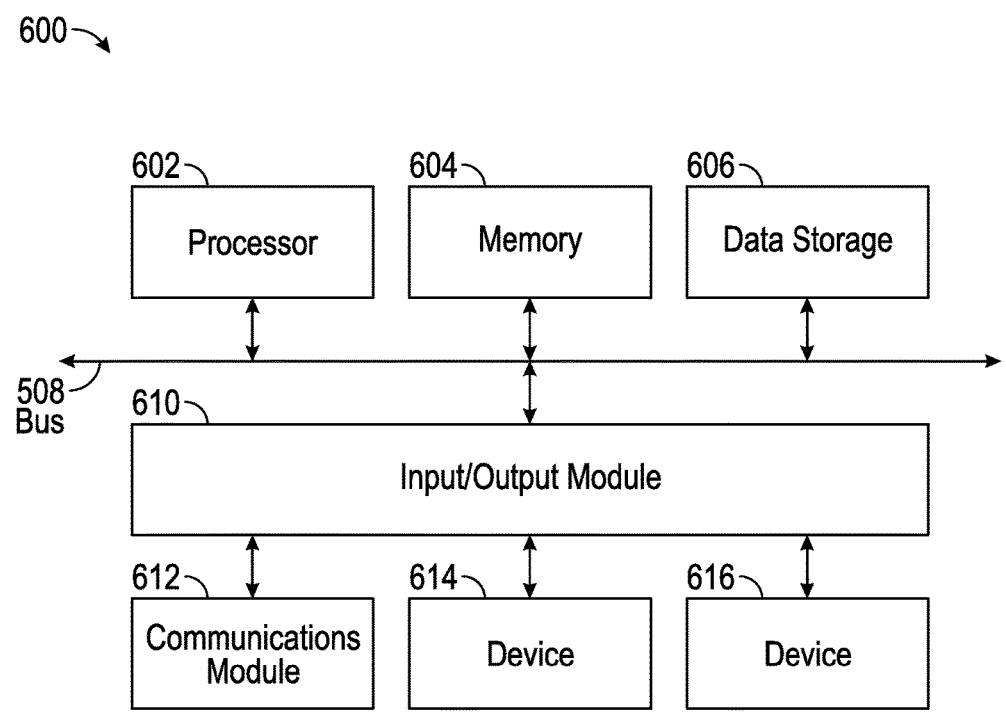
FIG. 6 is a block diagram illustrating an example computer system with which the client and server of FIG. 2 can be implemented.

FIG. 6 is a block diagram illustrating an example computer system 600 with which the client 110 and server 130 of FIG. 2 can be implemented. In certain aspects, the computer system 600 may be implemented using hardware or a combination of software and hardware, either in a dedicated server, or integrated into another entity, or distributed across multiple entities.

Computer system 600 (e.g., client 110 and server 130) includes a bus 608 or other communication mechanism for communicating information, and a processor 602 (e.g., processors 212 and 236) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Example input/output modules 610 include data ports such as USB ports. The input/output module 610 is configured to connect to a communications module 612. Example communications modules 612 (e.g., communications modules 218 and 238) include networking interface cards, such as Ethernet cards and modems. In certain aspects, the input/output module 610 is configured to connect to a plurality of devices, such as an input device 614 (e.g., input device 216) and/or an output device 616 (e.g., output device 214). Example input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 616 include display devices, such as a LED (light emitting diode), CRT (cathode ray tube), or LCD (liquid crystal display) screen, for displaying information to the user.

According to one aspect of the present disclosure, the client 110 and server 130 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 602 for execution. Such a medium may take many forms, including, but not limited to, non-volatile media, volatile media, and transmission media. Non-volatile media include, for example, optical disks, magnetic disks, or flash memory, such as data storage device 606. Volatile media include dynamic memory, such as memory 604. Transmission media include coaxial cables, copper wire, and fiber optics, including the wires that include bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for identifying visual portions of visual media files that are responsive to at least one visual media input file submitted as a search query, the method comprising:
   cropping at least a visual portion of each of a plurality of visual media files from a collection of media files;
   generating a data vector for each cropped visual portion for each of the plurality of visual media files;
   determining a visual similarity between the data vector for each cropped visual portion of each of the plurality of visual media files and a reference data vector representative of at least one reference visual media file associated with at least one known object; and
   when the visual similarity between the data vector for the cropped visual portion of one of the plurality of visual media files and the reference data vector exceeds a similarity threshold value, associating metadata for the at least one known object with the cropped visual portion of one of the plurality of visual media files and indexing the cropped visual portion of the one of the plurality of visual media files with the associated metadata in an index;
   comparing each of the cropped visual portions of the plurality of visual media files to one another to identify at least two cropped visual portions that when compared have a visual similarity score that exceeds another similarity threshold value, and removing at least one of the at least two cropped visual portions from the index when the compared at least two cropped visual portions have a visual similarity score that exceed the another similarity threshold value;
   receiving from a user a search query, for the collection of media files, comprising at least one visual media input file;
   analyzing the index of visual portions of the plurality of visual media files from the collection of media files to identify at least one responsive visual media file from the collection that comprises a visual portion associated with a visual similarity score, to the at least one visual media input file, which exceeds a similarity threshold value;
   generating an input data vector for the at least one visual media input file;
   performing a dot product between the input data vector for the at least one visual media input file with the data vector for each cropped visual portion for each of the plurality of visual media files to generate a dot product similarity score for each cropped visual portion for each of the plurality of visual media files;
   identifying a data vector for at least one responsive visual media file having a dot product similarity score exceeding a dot product similarity threshold value as being similar to the at least one visual media input file; and
   providing, in response to the search query, an identifier of the at least one responsive visual media file from the collection of media files for display as responsive to the search query.

2. The method of claim 1, wherein the at least one visual media input file is rotated to align with a predefined axis prior to generation of the data vector for the at least one visual media input file.

3. The method of claim 1, further comprising:
computing a distance between the input data vector for the at least one visual media input file and centroids of clusters for other input data vectors from previous search queries;
when the distance between the input data vector for the at least one visual media input file and at least one centroid of a cluster for other input data vectors is below a distance threshold, assigning the input data vector to the cluster; and
weighting the dot product similarity score for each cropped visual portion for each of the plurality of visual media files based on past responsiveness of the corresponding cropped visual portion to the cluster to which the input data vector is assigned.

4. The method of claim 1, wherein the user search query comprises multiple visual media input files, and wherein the analyzing the index of visual portions of the plurality of visual media files from the collection comprises identifying the at least one responsive visual media file from the collection that comprises visual portions associated with visual similarity scores to the visual portions of the multiple visual media input files that exceed a similarity threshold value.

5. The method of claim 4, wherein the providing the identifier of the at least one responsive visual media file from the collection of media files for display as responsive to the search query comprises providing identifiers of a plurality of responsive visual media files from the collection of media files in response to the search query, wherein each of the plurality of responsive visual media files from the collection of media files is associated with a responsiveness score, and wherein the identifiers of the plurality of responsive visual media files are prioritized for display according to the corresponding responsiveness score of the corresponding responsive visual media file.

6. The method of claim 5, wherein the responsiveness score is an average of the dot product similarity score for the dot product between each of the visual media input files and the corresponding responsive visual media file, or a sum of the dot product similarity score for the dot product between each of the visual media input files and the corresponding responsive visual media file.

7. A system for identifying visual portions of visual media files that are responsive to at least one visual media input file submitted as a search query, the system comprising:
a memory comprising instructions; and
a processor configured to execute the instructions to:
crop at least a visual portion of each of a plurality of visual media files from a collection of media files;
generate a data vector for each cropped visual portion for each of the plurality of visual media files;
determine a visual similarity between the data vector for each cropped visual portion of each of the plurality of visual media files and a reference data vector representative of at least one reference visual media file associated with at least one known object; and
when the visual similarity between the data vector for the cropped visual portion of one of the plurality of visual media files and the reference data vector exceeds a similarity threshold value, associate metadata for the at least one known object with the cropped visual portion of one of the plurality of visual media files and indexing the cropped visual portion of the one of the plurality of visual media files with the associated metadata in an index;
compare each of the cropped visual portions of the plurality of visual media files to one another to identify at least two cropped visual portions that when compared have a visual similarity score that exceeds another similarity threshold value, and removing at least one of the at least two cropped visual portions from the index when the compared at least two cropped visual portions have a visual similarity score that exceed the another similarity threshold value;
receive from a user a search query, for the collection of media files, comprising at least one visual media input file;
analyze the index of visual portions of the plurality of visual media files from the collection of media files to identify at least one responsive visual media file from the collection that comprises a visual portion associated with a visual similarity score, to the at least one visual media input file, which exceeds a similarity threshold value;
generate an input data vector for the at least one visual media input file;
perform a dot product between the input data vector for the at least one visual media input file with the data vector for each cropped visual portion for each of the plurality of visual media files to generate a dot product similarity score for each cropped visual portion for each of the plurality of visual media files;
identify a data vector for at least one responsive visual media file having a dot product similarity score exceeding a dot product similarity threshold value as being similar to the at least one visual media input file; and
provide, in response to the search query, an identifier of the at least one responsive visual media file from the collection of media files for display as responsive to the search query.

8. The system of claim 7, wherein the at least one visual media input file is rotated to align with a predefined axis prior to generation of the data vector for the at least one visual media input file.

9. The system of claim 7, wherein the processor is further configured to:
compute a distance between the input data vector for the at least one visual media input file and centroids of clusters for other input data vectors from previous search queries;
when the distance between the input data vector for the at least one visual media input file and at least one centroid of a cluster for other input data vectors is below a distance threshold, assign the input data vector to the cluster; and
weight the dot product similarity score for each cropped visual portion for each of the plurality of visual media files based on past responsiveness of the corresponding cropped visual portion to the cluster to which the input data vector is assigned.

10. The system of claim 7, wherein the user search query comprises multiple visual media input files, and wherein the processor being configured to analyze the index of visual portions of the plurality of visual media files from the collection comprises the processor being configured to identify the at least one responsive visual media file from the collection that comprises visual portions associated with visual similarity scores to the visual portions of the multiple visual media input files that exceed a similarity threshold value.

11. The system of claim 10, wherein the processor being configured to provide the identifier of the at least one responsive visual media file from the collection of media files for display as responsive to the search query comprises the processor being configured to provide identifiers of a plurality of responsive visual media files from the collection of media files in response to the search query, wherein each of the plurality of responsive visual media files from the collection of media files is associated with a responsiveness score, and wherein the identifiers of the plurality of responsive visual media files are prioritized for display according to the corresponding responsiveness score of the corresponding responsive visual media file.

12. The system of claim 11, wherein the responsiveness score is an average of the dot product similarity score for the dot product between each of the visual media input files and the corresponding responsive visual media file, or a sum of the dot product similarity score for the dot product between each of the visual media input files and the corresponding responsive visual media file.

13. A non-transitory machine-readable storage medium comprising machine-readable instructions for causing a processor to execute a method for identifying visual portions of visual media files that are responsive to at least one visual media input file submitted as a search query, the method comprising:

cropping at least a visual portion of each of a plurality of visual media files from a collection of media files;

generating a data vector for each cropped visual portion for each of the plurality of visual media files;

determining a visual similarity between the data vector for each cropped visual portion of each of the plurality of visual media files and a reference data vector representative of at least one reference visual media file associated with at least one known object; and when the visual similarity between the data vector for the cropped visual portion of one of the plurality of visual media files and the reference data vector exceeds a similarity threshold value, associating metadata for the at least one known object with the cropped visual portion of one of the plurality of visual media files and indexing the cropped visual portion of the one of the plurality of visual media files with the associated metadata in an index;

comparing each of the cropped visual portions of the plurality of visual media files to one another to identify at least two cropped visual portions that when compared have a visual similarity score that exceeds another similarity threshold value, and removing at least one of the at least two cropped visual portions from the index when the compared at least two cropped visual portions have a visual similarity score that exceed the another similarity threshold value;

receiving from a user a search query, for the collection of media files, comprising at least one visual media input file;

analyzing the index of visual portions of the plurality of visual media files from the collection of media files to identify at least one responsive visual media file from the collection that comprises a visual portion associated with a visual similarity score, to the at least one visual media input file, which exceeds a similarity threshold value;

generating an input data vector for the at least one visual media input file;

performing a dot product between the input data vector for the at least one visual media input file with the data vector for each cropped visual portion for each of the plurality of visual media files to generate a dot product similarity score for each cropped visual portion for each of the plurality of visual media files;

identifying a data vector for at least one responsive visual media file having a dot product similarity score exceeding a dot product similarity threshold value as being similar to the at least one visual media input file; and providing, in response to the search query, an identifier of the at least one responsive visual media file from the collection of media files for display as responsive to the search query.

\* \* \* \* \*